US007283308B2

(12) United States Patent
Cossairt et al.

(10) Patent No.: US 7,283,308 B2
(45) Date of Patent: *Oct. 16, 2007

(54) OPTICAL SYSTEMS FOR GENERATING THREE-DIMENSIONAL IMAGES

(75) Inventors: Oliver Strider Cossairt, Cambridge, MA (US); Michael Thomas, Belmont, MA (US); Rick K. Dorval, Goffstown, NH (US); Gregg Ethan Favalora, Cambridge, MA (US)

(73) Assignee: Actuality Systems, Inc., Bedford, MA (US)

( * ) Notice: Subject to any disclaimer, the term of this patent is extended or adjusted under 35 U.S.C. 154(b) by 224 days.

This patent is subject to a terminal disclaimer.

(21) Appl. No.: 11/073,913

(22) Filed: Mar. 7, 2005

(65) Prior Publication Data

US 2005/0213182 A1    Sep. 29, 2005

Related U.S. Application Data

(60) Provisional application No. 60/550,407, filed on Mar. 5, 2004.

(51) Int. Cl.
*G02B 3/00* (2006.01)
*G02B 26/00* (2006.01)
*G03B 21/26* (2006.01)

(52) U.S. Cl. .................. 359/649; 359/291; 353/94
(58) Field of Classification Search ........ 359/649–651, 359/291; 353/30, 94
See application file for complete search history.

(56) References Cited

U.S. PATENT DOCUMENTS 3,178,720 A    4/1965    Collender

| | | |
|---|---|---|
| 3,959,580 A | 5/1976 | Chocol et al. |
| 5,132,839 A | 7/1992 | Travis |
| 5,703,717 A | 12/1997 | Ezra et al. |
| 5,993,003 A | 11/1999 | McLaughlin |
| 6,224,214 B1 | 5/2001 | Martin |
| 6,388,697 B1 * | 5/2002 | Sonehara et al. ........... 347/239 |
| 6,533,420 B1 | 3/2003 | Eichenlaub |
| 6,799,850 B2 | 10/2004 | Hong et al. |
| 7,104,652 B2 * | 9/2006 | Kojima ........................ 353/33 |

OTHER PUBLICATIONS

Honda et al. "Three-dimensional display technologies satisfying 'super multiview condition.'" Three-dimensional video and display: devices and systems, pp. 218-249 (2001).

Travis, Adrian. "Autostereoscopic 3-D display." Applied Optics, vol. 29(29), pp. 4341-4343 (Oct. 10, 1990).

* cited by examiner

*Primary Examiner*—Scott J. Sugarman
(74) *Attorney, Agent, or Firm*—Fish & Richardson P.C.

(57) ABSTRACT

In general, in one aspect, the invention features systems that include a spatial light modulator, a scanning optical component configured to direct light from the spatial light modulator along a plurality of different paths, a projection optical assembly including a plurality of projection lens modules corresponding to the plurality of different paths, wherein each projection lens module is configured to receive light from the spatial light modulator directed along the corresponding path and projects an image of the spatial light modulator to a common image space.

22 Claims, 5 Drawing Sheets

OPTICAL SYSTEMS FOR GENERATING THREE-DIMENSIONAL IMAGES

CROSS-REFERENCE TO RELATED APPLICATIONS

This application claims priority under 35 USC § 119(e)(1) to Provisional Patent Application No. 60/550,407, entitled "3-D DISPLAY WITH MIRROR ARRAY," filed on Mar. 5, 2004, the entire contents of which are hereby incorporated by reference.

FEDERALLY SPONSORED RESEARCH OR DEVELOPMENT

The U.S. Government may have certain rights in this invention pursuant to Grant No. 70NANB3H3028 awarded by the National Institute of Standards and Technology (NIST).

TECHNICAL FIELD

This invention relates to optical devices and systems, and more particularly to optical devices and systems for generating three-dimensional images.

BACKGROUND

Three-dimensional displays create images that provide one or more stereoscopic depth cues to an observer, such as motion parallax and the ability to elicit an accommodation (focusing) response in the eye. A variety of three-dimensional display methodologies have been developed, including projecting patterns of light onto a moving or spinning surface, gating the transparency of shuttered glasses while gazing at alternating left- and right-eye viewpoints, or using an acousto-optic modulator to diffract laser light and then raster-scanning that light over an image plane.

SUMMARY

In general, in one aspect, the invention features systems that include a spatial light modulator, a scanning optical component configured to direct light from the spatial light modulator along a plurality of different paths, a projection optical assembly including a plurality of projection lens modules corresponding to the plurality of different paths, wherein each projection lens module is configured to receive light from the spatial light modulator directed along the corresponding path and projects an image of the spatial light modulator to a common image space.

Embodiments of the systems can include one or more of the following features. The systems can include relay optics that image the spatial light modulator to an intermediate image position. The intermediate image position can depend on the position of the scanning optical component. The intermediate image position can correspond the path along which the scanning optical component directs light from the spatial light modulator. The scanning optical component can be located at a pupil surface of the relay optics.

In some embodiments, the projection optical assembly further includes a collimating optical module configured to collimate light directed along the different paths. The projection optical assembly can further include a condensing optical module configured to condense light directed along the different paths after light is transmitted by the projection lens modules.

During operation, the scanning optical element can sequentially image the spatial light modulator image space along the plurality of different paths to generate a light field at the image space. The light field can correspond to a light field generated by a three-dimensional object. The scanning optical component can be a reflective scanning optical component or a transmissive optical component. The scanning optical component can include a plurality of diffractive elements. In some embodiments, the scanning optical component comprises at least two scanning optical components configured to scan in orthogonal directions. The plurality of projection lens modules can be arranged in an array.

The system can include a diffusing screen located at the image space. The plurality of paths can be arranged in a plane and the diffusing screen scatters incident light in a direction orthogonal to the plane. The spatial light modulator can be a zero-dimensional spatial light modulator or a one-dimensional spatial light modulator. In some embodiments, the spatial light modulator is a two-dimensional spatial light modulator. The spatial light modulator can be a micro electromechanical device. The spatial light modulator can be an emissive spatial light modulator or a reflective spatial light modulator.

The system can include a light source configured to direct light to reflect from the spatial light modulator. The light source can be a laser.

Embodiments of the invention can include one or more of the following advantages. Systems can be used as three-dimensional displays, providing updatable three-dimensional imagery. In some embodiments, three-dimensional displays can produce images having relatively large viewing angles. For example, three-dimensional displays are used to generate light fields corresponding to three-dimensional images that diverge over a wide range of angles in a horizontal viewing range. Accordingly, images can be viewed over a relatively large range of positions in the horizontal viewing plane and/or can be viewed by multiple observers simultaneously.

Alternatively, or additionally, systems used to generate three-dimensional images can diffuse light into a wide range of angles in a vertical viewing direction. Accordingly, in certain embodiments, three-dimensional images generated by three-dimensional displays can be viewed from positions over a relatively wide angular range in both the horizontal and vertical viewing directions.

Systems can be made using commercially available optical components. For example, three-dimensional displays can include a commercially available light source (e.g., a commercially available laser), a commercially available spatial light modulator (SLM) (e.g., a two dimensional SLM, such as a DMD™, or a liquid crystal display), and/or one or more commercially available optical components (e.g., lenses, iris, mirrors, diffusing screens). Accordingly, three-dimensional displays can be economically manufactured relative to systems that use custom-made components.

Furthermore, systems disclosed herein can utilize commercially available video processing hardware to create a three-dimensional frame database for generating drive signals for the system. As an example, in some embodiments, commercially available video cameras and/or personal computers can be used to acquire images of an object, to process the images to render frame data, and to store the frame data before uploading the data to the projector. Accordingly, three-dimensional displays and systems for providing image data for optical scanners can be relatively inexpensive.

The details of one or more embodiments of the invention are set forth in the accompanying drawings and the descrip-

DESCRIPTION OF DRAWINGS

Like reference symbols in the various drawings indicate like elements.

DETAILED DESCRIPTION

Three-dimensional displays are described. Embodiments include three-dimensional displays that can be used to generate variable optical wavefronts in an image space. In certain embodiments, when integrated over a certain time period, e.g., the integration time of the human visual system, the variable wavefronts correspond to a three-dimensional image.

Figure 1:
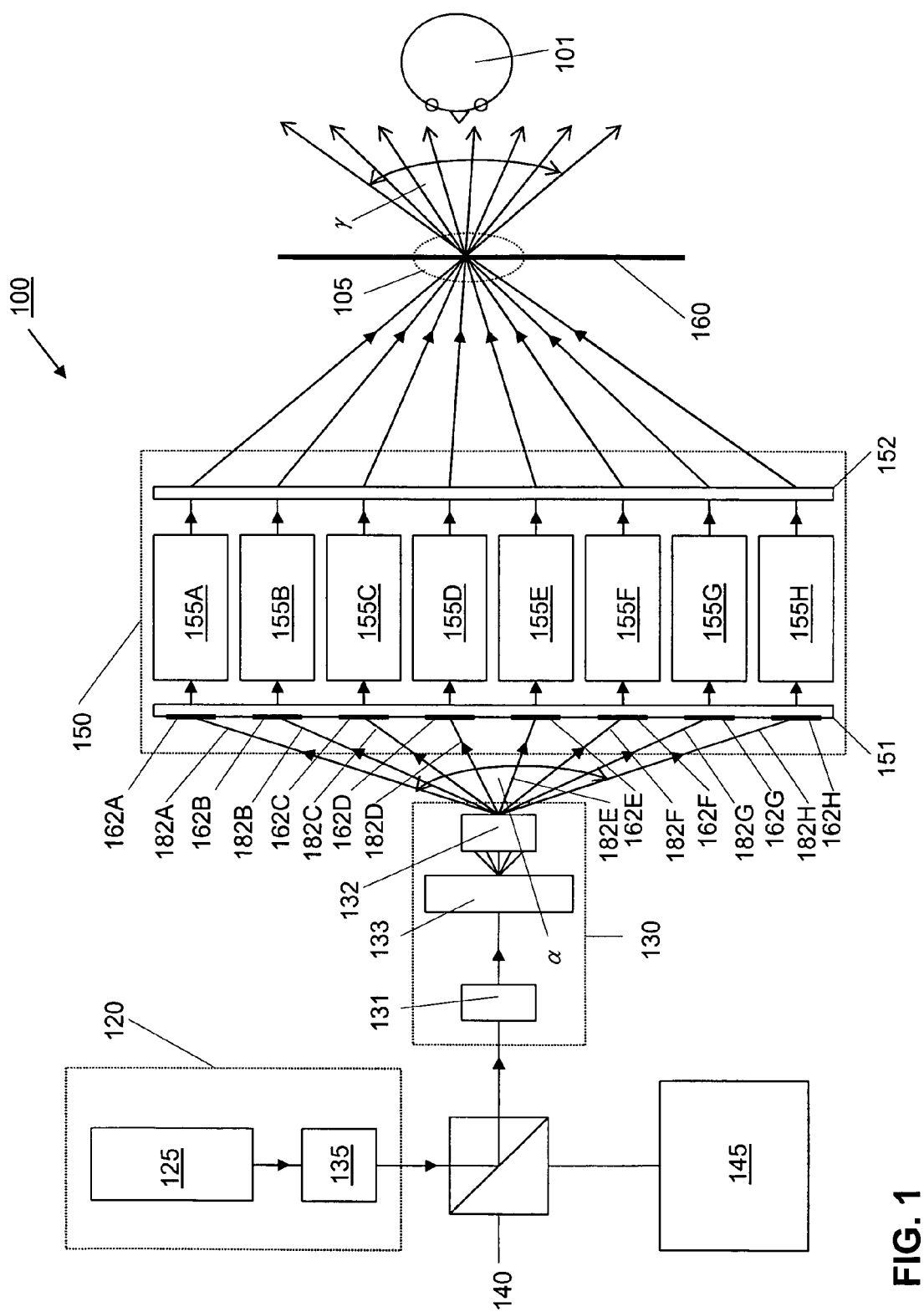
FIG. 1 is an schematic view of a three-dimensional display.

Referring to FIG. 1, a three-dimensional display 100 present a horizontal parallax only (HPO) three-dimensional image 101 to an observer 110. Three-dimensional display 100 includes an illumination module 120, a spatial light modulator (SLM) 140, a scanning optical assembly 130, and a projection optical assembly 150. During operation, illumination module 120 directs light to SLM 140, which optically modulates the light a directs the modulated light towards scanning optical assembly 130. Scanning optical assembly 130 scans the light sequentially along one of several paths 182A-182H in observer 110's horizontal viewing plane into projection optical assembly 150. For each path, projection optical assembly images SLM 140 to an image space co-incident with a diffusing screen 160. In general, the image space can straddle the plane of the screen, with some image of SLM 140 being located in front of and/or behind the plane of diffusing screen 160. Observer 110's visual system perceives the images from each path as a single HPO three-dimensional image 105.

Illumination module 120 includes a laser 125 and a collimator 135. Collimator 135 creates an approximately cylindrical beam from the cone of light from laser 125 and directs the beam toward SLM 140.

Laser 125 can be one of a variety of lasers, and is typically selected to provide light of a desired wavelength or band of wavelengths. Usually, at least in applications where three-dimensional display 100 is used to generate a three-dimensional image, the wavelength or wavelengths are in the visible portion of the electromagnetic spectrum (e.g., from about 380 nm to about 780 nm). Laser 125 can be a continuous wave or pulsed laser. As an example, laser 125 can be a green 150 mW diode-pumped solid-state laser, such as a Compass 315MTM laser (available from Coherent, Inc., Santa Clara, Calif.), which has an emission wavelength at 532 nm.

Laser 125 should provide sufficient intensity at the desired wavelength or band of wavelengths for to be visible in the viewing conditions for which three-dimensional display 100 is designed. In some embodiments, where laser 125 is a continuous wave laser, the light intensity can be about 10 mW or more (e.g., about 100 mW or more, about 0.5 W or more, about 1 W or more). In some embodiments, laser intensity should not be so high as to damage an observer's eyesight.

In certain embodiments, illumination module can include additional components. For example, illumination module 120 can include a spatial filter positioned between laser 125 and collimator 135. In some embodiments, a phase randomizer, such as a spinning diffuser, may be placed between laser 125 and spatial filter 130. The phase randomizer can reduce coherence effects (e.g., interference effects, such as speckle) associated with the light emitted from laser 125.

SLM 140 is in communication with an electronics module 145 and optically modulates incident light from illumination module 120 based on signals it receives from electronics module 145. In some embodiments, SLM 140 is a two-dimensional microdisplay operating at about 5,000 frames per second or more with a frame resolution of 1024×768 or more. For example, a Digital Micromirror Device (DMD™), available from Texas Instruments (Plano, Tex.), may be used. A DMD™ includes an array of reflective elements (i.e., pixels). Each element can be oriented in at least two positions, independent of the orientation of the other reflective elements in the array. In one position, the element reflects light from illumination module 120 towards scanning optical assembly 130, while in the other position the element reflects light in some other direction. Accordingly, the DMD™ modulates the amplitude of a beam from illumination module 120 in a pixel-wise fashion, based on signals from control electronics 145.

Scanning optical assembly 130 generates three-dimensional image 105 at diffusing screen 160 by scanning modulated light from SLM 140 over different paths 182A-182H through to the image space where image 105 is created. Scanning optical assembly 130 includes lenses 131 and 132 and an scanning optical component 133. In certain embodiments, scanning optical component 133 is co-coincident with a pupil surface (e.g., a pupil plane) of an imaging optical system formed by, e.g., lenses 131 and 132.

Scanning optical component 133 can be a transmissive scanning component or a reflective scanning component. Examples of reflective scanning components include vibrating galvanometer (galvo) mirror scanners, moving mirror arrays and reflective holographic scanners. Galvo mirror scanners typically include a mirror that rotates back and forth either continuously or in a step-wise fashion, e.g., from about −20 degrees to about +20 degrees.

A moving mirror array includes an array of mirrors each having different orientations with respect to the light beam directed from SLM 140. The mirrors are coupled to a scanning component which moves the different mirrors in and out of the path of the beam from SLM 140, so that each mirror directs light corresponding to a single two-dimensional image frame along a corresponding one of paths 182A-182H.

Figure 2B:
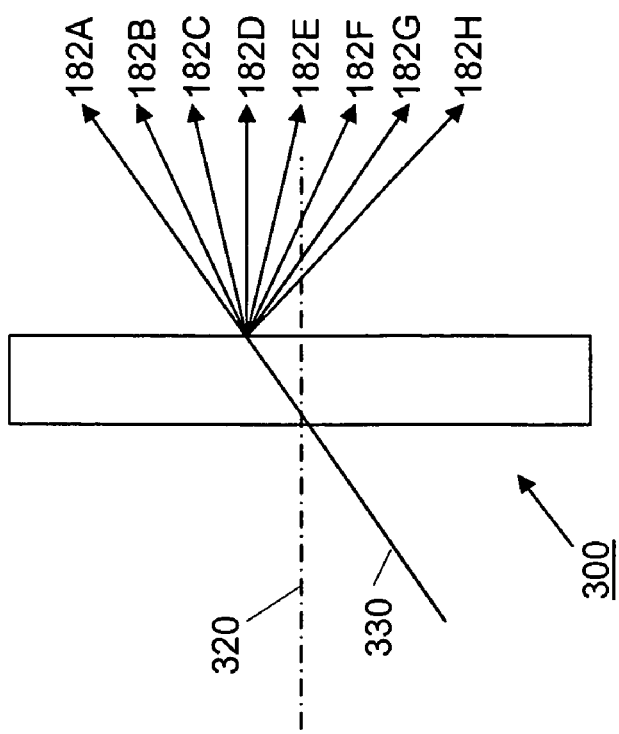
FIG. 2B is another diagram of the diffractive optical scanner shown in FIG. 2A.
Figure 2A:
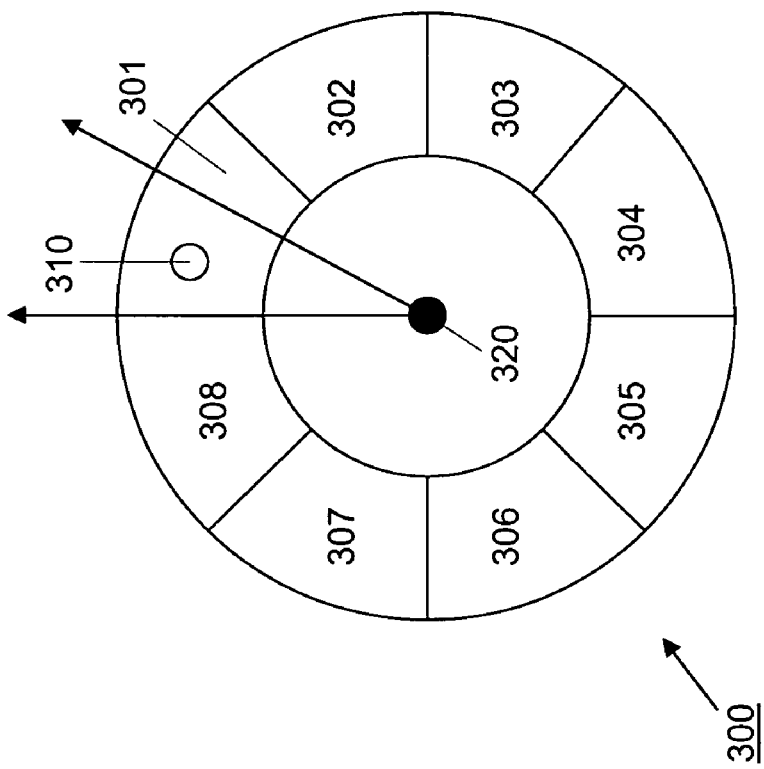
FIG. 2A is a diagram of an embodiment of a diffractive optical scanner.

An example of a transmissive scanning component is holographic scanner 300 shown in FIGS. 2A and 2B. Scanner 300 includes radial sections 301-308. Each section is encoded with a different diffraction pattern, which is a function of the desired scan angle and wavelength. Each section directs an beam incident on the element along a path 330 in a different direction. During operation, scanner 300 is rotated about its cylindrical axis 320. Illumination from SLM 140 is incident on scanner 300 along path 330. The relative size of the illumination beam, shown as spot 310 in FIG. 2A, is smaller than the size of each radial section. Depending on which section is in the path of the illumination beam, scanner 300 directs the beam along different paths, corresponding to paths 182A-182H.

A scanning optical component that scans back and forth over paths 182A-182H should scan at a rate that reduces (e.g., eliminates) flicker in the eyes of observer 110. For example, an scanning optical component should have a peak-to-peak scan frequency at or above 15 Hz, which corresponds to a scan time of about 1/30 second or less over the scan range (i.e., over paths 182A-182H). In other words, because the scanning optical component covers the scan range twice during a peak-to-peak scan, a scan frequency of about 15 Hz or more will support about a 30 Hz or more image refresh rate, which corresponds to image refresh rates at which flicker is reduced to industry-accepted levels.

Optical scanning assembly 130 is generally designed to scan light from SLM 140 over a range of angles sufficiently large to include paths 182A-182H. In general, the scan range, shown as a in FIG. 1, can be relatively large (e.g., about 15° or more, about 20° or more, about 25° or more, about 30° or more, about 35° or more, about 40° or more, about 45° or more). Alternatively, in some embodiments, a can be less than about 15° (e.g., about 12° or less, about 10° or less, abut 8° or less, about 5° or less).

In general, lenses 131 can be compound lens (e.g., include two or more component lenses) or single lenses. Lenses 131 and 132 and scanning optical component image SLM 140 to an intermediate image surface in projection optical system 150. For each path 182A-182H, scanning optical assembly 130 images SLM 140 to image locations 162A-162H, respectively. The image can be the same size as SLM 140, or can be magnified (e.g., about 2× or more, about 3× or more, about 5× or more) or demagnified.

Image locations 162A-162H are located proximate to a collimating lens 151 in projection optical assembly 150. Collimating lens 151 collimates light and directs it into one of projection lens modules 155A-155H depending on which path the scanning optical assembly directed the light along. Projection optical assembly 150 also includes a condenser lens 152 which directs light exiting the projection lens modules towards the image space at diffusing screen 160.

Projection optical assembly projects the intermediate images formed at locations 162A-162H out to diffusing screen 160. Typically projection optical assembly magnifies the intermediate images (e.g., by a factor of about two or more, about three or more, about five or more, about 10 or more, about 20 or more, about 50 or more).

Collimating lens 151 can be include a number of elements (e.g., component lenses) corresponding to projection lens modules 155A-155H. The elements can be discrete or part of a monolithic structure. In some embodiments, collimating lens 151 is a Fresnel lens structure. Similarly, condensing lens 152 can be include a number of elements (component lenses), either discrete or part of a monolithic structure, corresponding to projection lens modules 155A-155H. Condensing lens 152 can be a Fresnel lens structure. In some embodiments, collimating lens 151 and/or collimating lens 152 can be compound lenses, including more than one element per light path.

Typically, each projection lens module 155A-155H includes several component lenses. In general, each module includes components sufficient so that, in conjunction with collimating lens 151 and condenser lens 152, it can project an intermediate image of SLM 140 out to the image space.

Component lenses forming collimating lens 151, condenser lens 152, and/or projection lens modules 155A-155H can have circular or non-circular profiles. In some embodiments, one or more component lenses have an approximately rectangular profile, which can improve the ease with which component lenses can be stacked. Generally, the components lenses can be spherical or aspheric lenses.

In general, the input numerical aperture of projection optical assembly 150 should be sufficiently large to accept light directed along all paths 182A-182H. In other words, the input numerical aperture of projection optical assembly 150 should correspond to an angular range of about a or more. Since projection optical assembly 150 includes an array of projection lens modules 155A-155H, the input numerical aperture of projection optical assembly corresponds to the sum of the module numerical apertures, rather than the numerical aperture of a single module. In certain embodiments, projection optical assembly 150 can have a relatively large numerical aperture (e.g., about 0.5 or more, about 0.6 or more, about 0.7 or more, about 0.8 or more, about 0.9 or more).

Vertical diffusing screen 160 spreads the light vertically with respect to observer 110, allowing the observer to move vertically and still see image 105 from a range of vertical positions. Vertical diffusing screens can decrease the information and bandwidth requirements of multiview three-dimensional displays. In general, diffusing screens can introduce horizontal as well as vertical diffusion. Horizontal diffusion can provide a more visually appealing three-dimensional image by blending the images of adjacent frames. The amount of horizontal diffusion can vary as desired. Typically, diffusing screen 160 has more vertical than horizontal diffusion, however, in some embodiments, the diffusing screen can have about the same amount of vertical and horizontal diffusion or even more horizontal than vertical diffusion. In some embodiments, vertical diffusing screen 160 is a 4"×4" optic with a 0.2-degree horizontal diffusion and 30 degree vertical diffusion, as made by Physical Optics Corporation (Torrance, Calif.).

While certain embodiments have been described, in general, three-dimensional display 100 can include additional components such as one or more aperture stops to reduce unwanted illumination from exiting the three-dimensional display. In some embodiments, three-dimensional display 100 can include one or more mirrors configured to fold the optical path(s) in the three-dimensional display, providing a more compact package.

In some embodiments, three-dimensional display can include a phosphor at or near the entry surface of collimating lens 151, for example. A phosphor can improve the quality of three-dimensional image 105 by maintaining the intermediate images projected to locations 162A-162H beyond the time that optical scanning assembly 130 directs light along each corresponding path. This can reduce effects such as flicker of image 105.

Furthermore, embodiments can include components that are structurally different but perform similar functions to those described. For example, in some embodiments, collimating lens 151 can be replaced by a faceted mirror array or faceted wedge array.

In general, three-dimensional display 100 can include standard, commercially available components and/or custom made components. For example, one or more of the passive components (e.g., lenses, iris, diffuser, mirror) can be obtained commercially. Furthermore, active components, such as laser 125, SLM 140, and scanning optical component 133 can be obtained commercially. Using commercially available components can reduce the cost of three-dimensional display 100, providing an economic advantage to the manufacturer.

Furthermore, although three-dimensional display 100 forms three-dimensional image 105 by forming images of SLM 140 by direction light along eight different paths, in general, three-dimensional displays can be configured to generate three-dimensional imagery by directing light along other numbers of paths. In general, the number of paths is selected based on the desired viewing angle and/or resolution of the three-dimensional image, and the frame rate of the SLM and associated electronic drivers. Typically, a three-dimensional display will include a larger number of paths if a large viewing angle or high resolution is desired. In some embodiments, the three-dimensional display can include about 10 or more paths (e.g., about 12 or more paths, about 20 or more paths, about 30 or more paths, about 40 or more paths, about 50 or more paths). In certain embodiments, a three-dimensional display includes 32 paths.

As discussed previously, three-dimensional display 100 constructs image 105 by directing light from laser 125 along a number of different ray paths through image an image space corresponding to diffusing screen 160 such that the light forms an approximation of a wavefront that would emanate towards observer 110 from a surface of a three-dimensional scene located at the image space. SLM 140 modulates the cross-sectional profile of the light beam from laser 125 as scanning optical component 133 directs the light successively along paths 182A-182H so that the light field at the image space integrated over a single excursion the scanning optical component over paths 182A-182H corresponds to a three-dimensional image wavefront. The wavefronts are synthesized in a time-division-multiplexed manner. In other words, at any instant only a subset of the rays forming the wavefront emanate through the image space. However, the image looks complete to observer 110 when summed over the integration period of observer 110's eye (e.g., about ⅟30 second).

Control electronics 145 and the frame data driving SLM 140 should account for the time-varying relationship between the drive command of scanning optical component 133 and SLM 140 so that appropriate frames are directed to scanning optical component 133 when it is oriented to direct the light field along the appropriate path.

The light field corresponding to three-dimensional image 105 is composed of a number of SLM image frames of differing orientation with respect to observer 110. Three-dimensional display 100 projects each of these frame images at different times to the image space. This process is described with reference to FIGS. 3A-3C below.

Figure 3A:
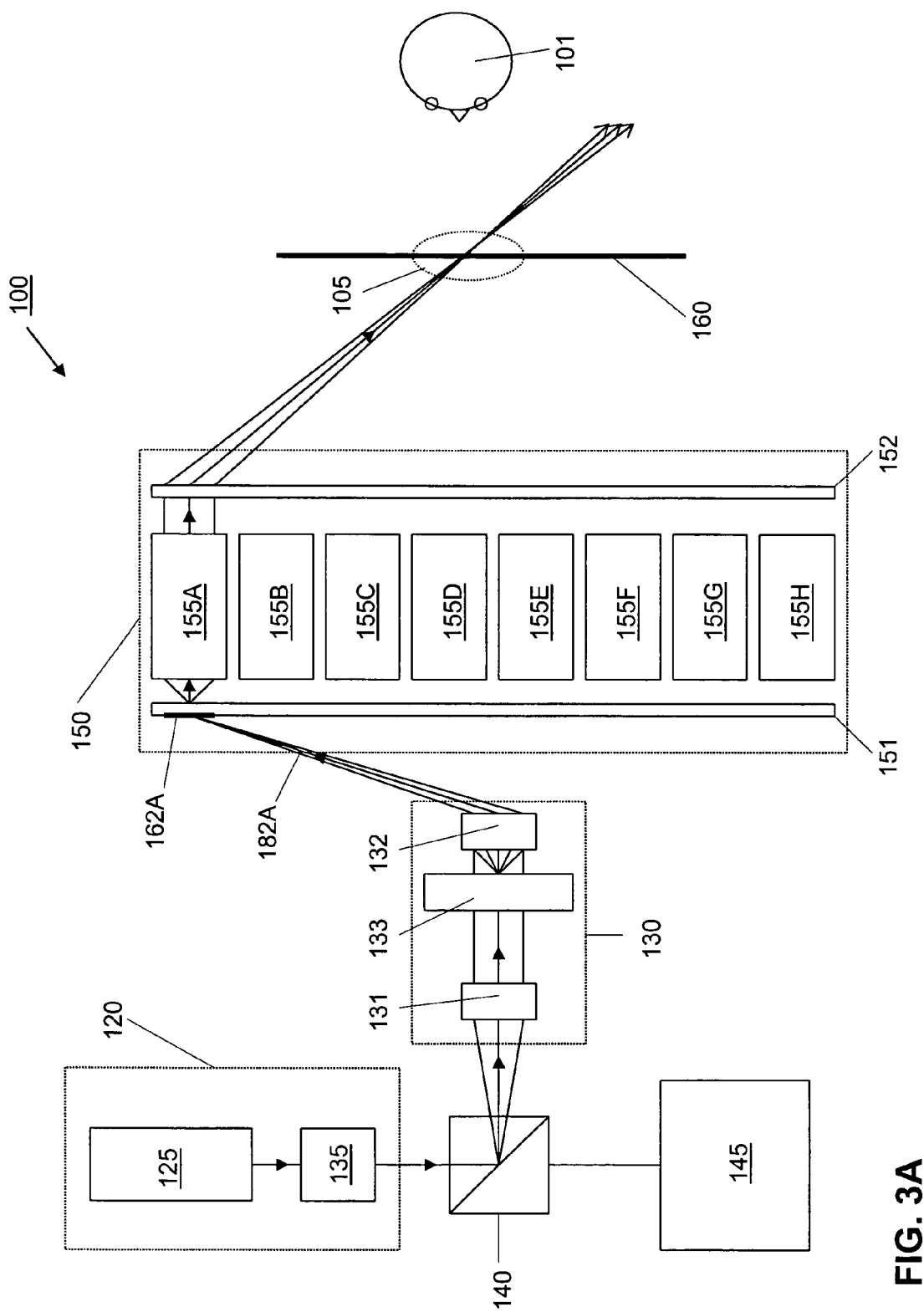
FIG. 3A-FIG. 3C are schematic views of the three-dimensional display shown in FIG. 1 at three different times during an operating cycle of the three-dimensional display.

Referring to FIG. 3A, once a first modulation pattern is loaded into SLM 140, SLM 140 reflects a beam having a spatially-modulated profile to scanning optical assembly 130. At the instant in time corresponding to when the first modulation pattern is loaded into SLM 140, $t_1$, scanning optical component 133 is configured to direct light along path 182A to projection optical assembly 150. Scanning optical assembly 130 images SLM to intermediate image location 162A and, using projection lens module 155A, projection optical assembly 150 projects the SLM image out to vertical diffusing screen 160 positioned at the image space. Vertical diffusing screen 160 diffusers the light forming the SLM frame image vertically, and observer 110 views all, part, or none of the frame image depending on their position with respect to the image space.

Figure 3B:
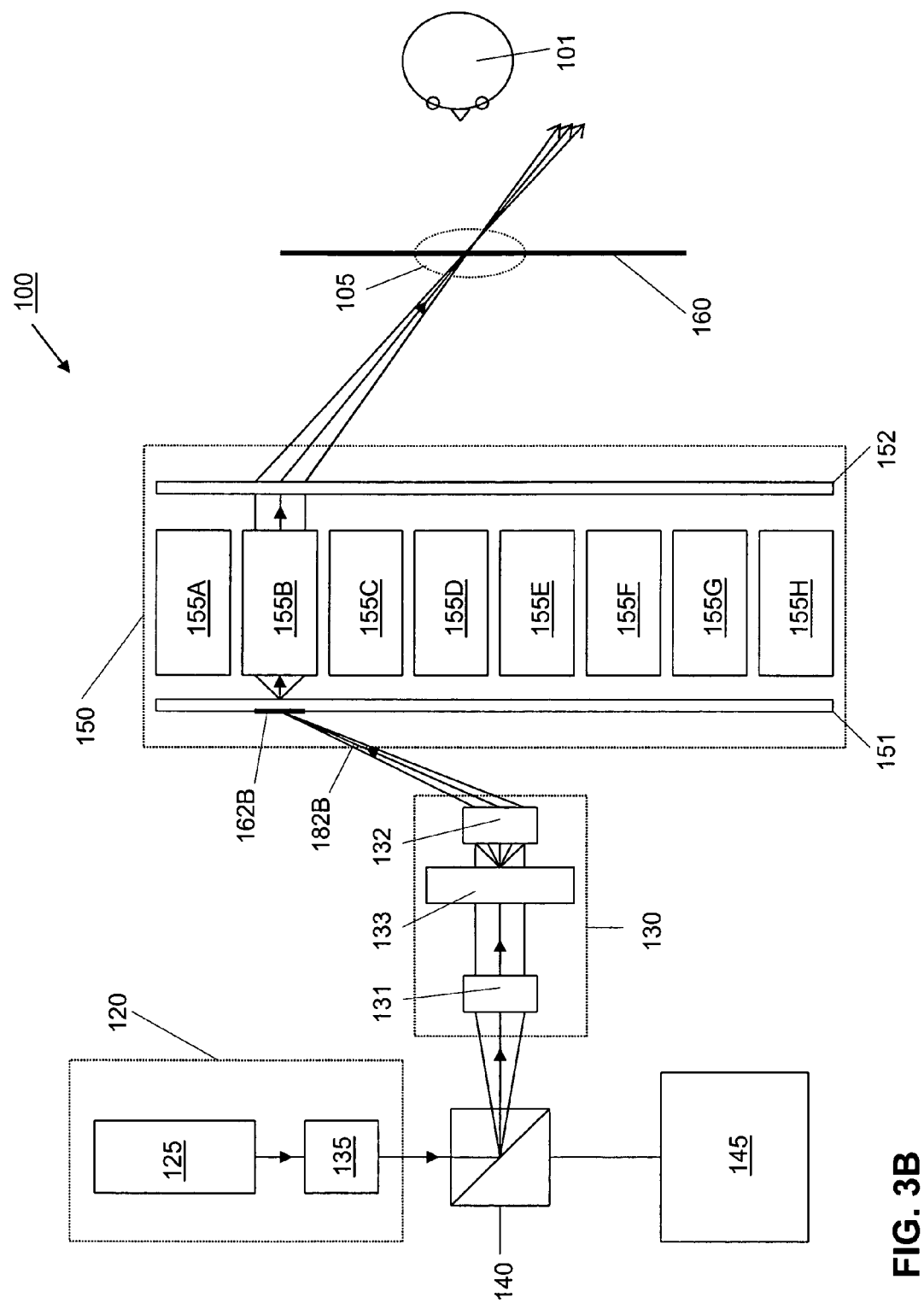

Referring to FIG. 3B, at a later time, $t_2$, a new modulation pattern is loaded into SLM 140, and optical scanning assembly 130 is configured to direct light reflected from SLM 140 along path 182B, forming an intermediate image of the SLM frame at location 162B. Along this path, the image of SLM 140 is projected out to the image space using projection lens module 155B. The wavefronts forming the projected image are oriented over a different range compared to the wavefronts forming the previous image since the paths follow different directions in the horizontal viewing plane.

Figure 3C:
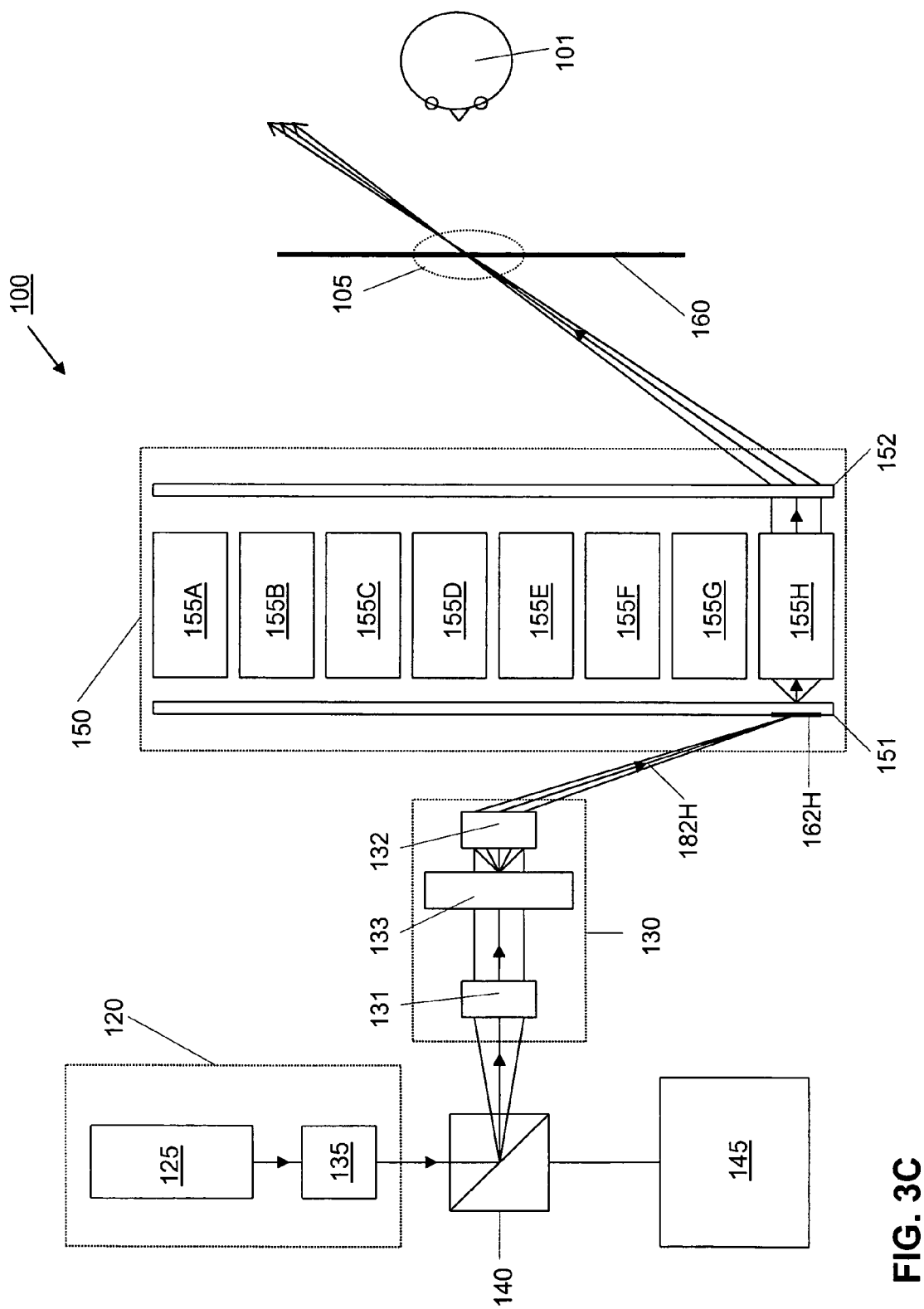

Referring to FIG. 3C, at a still later time, $t_8$, optical scanning assembly 130 directs light from SLM 140 along path 182H, forming an intermediate of the SLM frame at location 162H. Projection lens module 155H operates in conjunction with collimator 151 and condenser 152 to project this image out to the image space. All the frame images projected out to the image space from $t_1$ to $t_8$ contribute to the three-dimensional image perceived by observer 110.

As discussed previously, SLM 140 should modulate illumination from laser 125 in an appropriate manner so that three-dimensional display 100 generates frames corresponding to the desired three-dimensional imagery at the image space. To achieve appropriate modulation of the laser illumination, control electronics provide drive signals to SLM 140. These drive signals are generated by first acquiring a computational description of the three-dimensional image. From this computational description, an electronic processor determines the data corresponding to one or more frames that are projected through one or more portions of image surface 190. In some embodiments, the electronic processor is remote from scanner 100 and control electronics store the image data in local video random access memory.

A computational description of a three-dimensional image for projection using three-dimensional display 100 can be acquired in a variety of ways. For example, in some embodiments, a database of frame data can be synthesized by rendering a three-dimensional scene from viewpoints of a computer-graphic camera moving along a linear track. An algorithm for generating frame data from images of an object is described, for example, in U.S. Provisional Patent Application No. 60/560,006, entitled "RENDERING FOR MULTIVIEW/HOLOGRAPHIC VIDEO," filed on Apr. 5, 2004, the entire contents of which are hereby incorporated by reference.

If the three-dimensional image changes, the frames directed along each path can change for different scans. For a stationary image, however, the modulation pattern is repeated each time the scanning mirror returns to the corresponding orientation.

The frame refresh rate of SLM 140 depends on the type of SLM being used. In some embodiments, for example where SLM 140 is a Micro-Electro-Mechanical System (MEMS) (e.g., a DMD™), the frame refresh rate can be relatively high (e.g., about 100 Hz or more, about 500 Hz or more, about 1,000 Hz or more, about 5,000 Hz or more). The actual frame refresh rate can be the same as or less than the maximum refresh rate for SLM 140.

The viewing angle of three-dimensional display 100 refers to the range of angles, in both the horizontal and vertical viewing directions, over which image 105 can be viewed. The vertical and horizontal viewing angles can be the same or different. The horizontal viewing angle depends on the range over which mirror 176 is scanned, and on the optical power of scan optics module 180. For example, the larger the range of angles over which mirror 176 is scanned, the larger the horizontal range over which images are directed. In some embodiments, the horizontal viewing angle, shown as γ in FIG. 1, can be about ±10° or more (e.g., ±12° or more, ±15° or more, ±20° or more). The vertical viewing angle depends on the type of vertical diffuser used at image surface 190. In some embodiments, the vertical viewing angle is about ±10° or more (e.g., ±12° or more, ±15° or more, ±20° or more).

While certain embodiments have been described, it will be understood that various modifications may be made to three-dimensional display 100 without departing from the spirit and scope of the invention. For example, while three-dimensional display 100 includes a laser light source, in certain embodiments other light sources can be used. Examples of other light sources include one or more light emitting diodes or arc lamps (e.g., an ultra-high-pressure mercury arc lamp). In general, the light source should provide sufficient intensity at one or more wavelengths to provide a viewable image in lighting conditions for which three-dimensional display 100 is designed.

Furthermore, in general SLMs other than a DMD™ can be used. For example, pixellated Liquid Crystal on Silicon (LCoS) arrays or ferroelectric liquid crystal displays (FELCDs) can be used. Moreover, in some embodiments, instead of a two-dimensional SLM, a scanned device, such as a scanned laser can be used to provide a modulated light field. A scanned laser is an example of a zero-dimension (e.g., point-like) SLM. One-dimensional SLMs, such as a Grating Light Valve (available from Silicon Light Machines™, Sunnyvale, Calif.) can also be used. In general, SLMs can include reflective devices (e.g., DMD™), transmissive devices (e.g., a transmissive LCD), and/or emissive devices (e.g., organic light emitting diode displays).

In some embodiments, a three-dimensional display can perform a two-dimensional scan across the image plane (e.g., scan in both the horizontal and vertical viewing directions), thereby creating full-parallax imagery. For example, a three-dimensional display can include two ganged holographic optical scanners that are configured to direct input light over orthogonal ranges of paths. One of the scanners directs light along different horizontal paths, for example, while the other directs incident light along different vertical paths.

In certain embodiments, component three-dimensional displays are tiled to provide larger images. For example, several three-dimensional displays like three-dimensional display 100 can be positioned relative to one another so that their images are seamlessly tiled. By providing appropriate frame data to each scanner, the multi-three-dimensional display system can be used to form a single large image.

In some embodiments, tiled systems can share one or more components. For example, multiple systems can use light from a single light source (e.g., by providing a beam splitter between the light source and other components of the systems, a single light source can be used).

Although three-dimensional display 100 generates monochromatic three-dimensional images, in some embodiments three-dimensional displays can be used to generate full color images. As an example, three-dimensional display 100 can be adapted to include three different light sources, each a different color (e.g., red, green, and blue, or cyan, magenta, and yellow). Light from each source can be modulated using a different SLM. The modulated light can then be combined, for example, prior to incidence on optical scanning element 133. Accordingly, image 105 will then be composed of frames of the three different colors.

While in the foregoing discussion three-dimensional display 100 is used to generate three-dimensional images, in some embodiments, three-dimensional displays can be used for other applications. For example, three-dimensional displays can be used to generate complex wavefronts that can be used in interferometric applications. As an example, complex wavefronts can be used to interferometrically probe complex optical surfaces, such as the surface of an aspheric lens or mirror. This can be achieved, for example, by using a three-dimensional display to construct a wavefront mimicking a wavefront that would reflect from a complex optical surface if the optical surface is free of defects. This wavefront is then interfered with a wavefront from the actual optical surface. Defects in the optical surface can manifest as variations in the phase of the interferogram across its area. Accordingly, optical scanners can be used in metrology applications.

In some embodiments, three-dimensional displays can be used to generate an object wavefront for a holographic recording. In other words, a three-dimensional display can replace an object by generating a wavefront mimicking the wavefront that would be formed by illuminating the object with light. This wavefront can be interfered with a reference beam on a recording medium to provide a holographic recording. The reference wavefront can be provided from the same light source as used in the scanner by, for example, splitting the output of the light source and directing a portion of the output directly to the recording medium.

Alternatively, or additionally, to generating complex wavefronts, three-dimensional displays can be used to direct an input beam along one or more different paths. For example, optical scanners can be used in beam steering applications (e.g., for optical communications). Optical scanners can also be used in optical computing applications, for optical interconnections, and/or high-speed optical scanning, for example.

Other embodiments are within the scope of the following claims.

What is claimed is:

1. A system, comprising:
   a spatial light modulator;
   a scanning optical component configured to direct light from the spatial light modulator along a plurality of different paths;
   a projection optical assembly comprising a plurality of projection lens modules corresponding to the plurality of different paths,
   wherein each projection lens module is configured to receive light from the spatial light modulator directed along the corresponding path and projects an image of the spatial light modulator to a common image space.

2. The system of claim 1 further comprising relay optics that image the spatial light modulator to an intermediate image position.

3. The system of claim 2 wherein the intermediate image position depends on the position of the scanning optical component.

4. The system of claim 2 wherein the intermediate image position corresponds the path along which the scanning optical component directs light from the spatial light modulator.

5. The system of claim 2 wherein the scanning optical component is located at a pupil surface of the relay optics.

6. The system of claim 1 wherein the projection optical assembly further comprises a collimating optical module configured to collimate light directed along the different paths.

7. The system of claim 1 wherein the projection optical assembly further comprises a condensing optical module configured to condense light directed along the different paths after light is transmitted by the projection lens modules.

8. The system of claim 1 wherein during operation the scanning optical element sequentially images the spatial light modulator to the image space along the plurality of different paths to generate a light field at the image space.

9. The system of claim 8 wherein the light field corresponds to a light field generated by a three-dimensional object.

10. The system of claim 1 wherein the scanning optical component is a reflective scanning optical component.

11. The system of claim 1 wherein the scanning optical component is a transmissive scanning optical component.

12. The system of claim 1 wherein the scanning optical component comprises a plurality of diffractive elements.

13. The system of claim 1 wherein the scanning optical component comprises at least two scanners configured to scan in orthogonal directions.

14. The system of claim 1 wherein the plurality of projection lens modules are arranged in an array.

15. The system of claim 1 further comprising a diffusing screen located at the image space.

16. The system of claim 15 wherein the plurality of paths are arranged in a plane and the diffusing screen scatters incident light in a direction orthogonal to the plane.

17. The system of claim 1 wherein the spatial light modulator is a zero-dimensional spatial light modulator or a one-dimensional spatial light modulator.

18. The system of claim 1 wherein the spatial light modulator is a two-dimensional spatial light modulator.

19. The system of claim 18 wherein the spatial light modulator is a micro electromechanical device.

20. The system of claim 1 wherein the spatial light modulator is an emissive spatial light modulator or a reflective spatial light modulator.

21. The system of claim 1 further comprising a light source configured to direct light to reflect from the spatial light modulator.

22. The system of claim 21 wherein the light source is a laser.

* * * * *